United States Patent
Zhang et al.

(10) Patent No.: US 10,414,371 B2
(45) Date of Patent: Sep. 17, 2019

(54) AIRBAG APPARATUS

(71) Applicant: TOYODA GOSEI CO., LTD., Kiyosu-shi, Aichi-ken (JP)

(72) Inventors: Ning Zhang, Beverly Hills, MI (US); Shiro Ohara, Ypsilanti, MI (US); Aviral Shrivatri, Livonia, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 230 days.

(21) Appl. No.: 15/683,878

(22) Filed: Aug. 23, 2017

(65) Prior Publication Data
US 2019/0061668 A1     Feb. 28, 2019

(51) Int. Cl.
*B60R 21/207* (2006.01)
*B60R 21/231* (2011.01)
*B60R 21/2338* (2011.01)

(52) U.S. Cl.
CPC .......... *B60R 21/207* (2013.01); *B60R 21/231* (2013.01); *B60R 21/2338* (2013.01); *B60R 2021/23153* (2013.01); *B60R 2021/23386* (2013.01)

(58) Field of Classification Search
CPC .............. B60R 21/207; B60R 21/2338; B60R 2021/23107; B60R 2021/23153; B60R 2021/23386; B60R 2021/26064; B60R 21/232; B60R 21/231; B60R 21/233
USPC ....................................................... 280/728.1
See application file for complete search history.

(56) References Cited

U.S. PATENT DOCUMENTS

| | | | | |
|---|---|---|---|---|
| 8,622,417 B1* | 1/2014 | Schneider | ........... | B60R 21/2338 280/729 |
| 9,308,883 B1* | 4/2016 | Schneider | ............. | B60R 21/231 |
| 10,035,484 B2* | 7/2018 | Jaradi | ................... | B60R 21/207 |
| 2011/0031722 A1* | 2/2011 | Baumann | ............... | B60R 21/231 280/728.1 |
| 2012/0193896 A1* | 8/2012 | Turnbull | ............... | B60R 21/233 280/729 |
| 2015/0203066 A1* | 7/2015 | Pausch | .................. | B60R 21/231 280/730.1 |

(Continued)

FOREIGN PATENT DOCUMENTS

| | | | | |
|---|---|---|---|---|
| CN | 103332162 A | 10/2013 | | |
| DE | 10325124 A1 * | 12/2004 | ........... | B60R 21/231 |

(Continued)

*Primary Examiner* — Paul N Dickson
*Assistant Examiner* — Hilary L Johns
(74) *Attorney, Agent, or Firm* — Posz Law Group, PLC

(57) ABSTRACT

An airbag apparatus includes an inflator and an airbag. The air bag is accommodated in a housing located in front of a seat arranged in a passenger compartment of a vehicle and configured to be deployed and inflated from the housing toward the seat by an inflating gas supplied from the inflator. The airbag includes at least three regular inflation portions arranged next to one another from the housing toward the seat, an upper connecting inflation portion that connects upper ends of adjacent ones of the regular inflation portions to each other, and a lower connecting inflation portion that connects lower ends of adjacent ones of the regular inflation portions to each other. The upper connecting inflation portion and the lower connecting inflation portion are alternately arranged from the housing toward the seat.

8 Claims, 6 Drawing Sheets

(56) References Cited

U.S. PATENT DOCUMENTS

2016/0107598 A1* 4/2016 Fischer ................ B60R 21/231
                                                    280/729
2017/0113646 A1* 4/2017 Lee .................... B60R 21/2338
2017/0174172 A1* 6/2017 Burczyk .............. B60R 21/231
2017/0291566 A1* 10/2017 Karlow ................ B60R 21/276

FOREIGN PATENT DOCUMENTS

DE        10325124 A1    12/2004
WO      2015/120970 A1    8/2015
WO      2016/087009 A1    6/2016

* cited by examiner

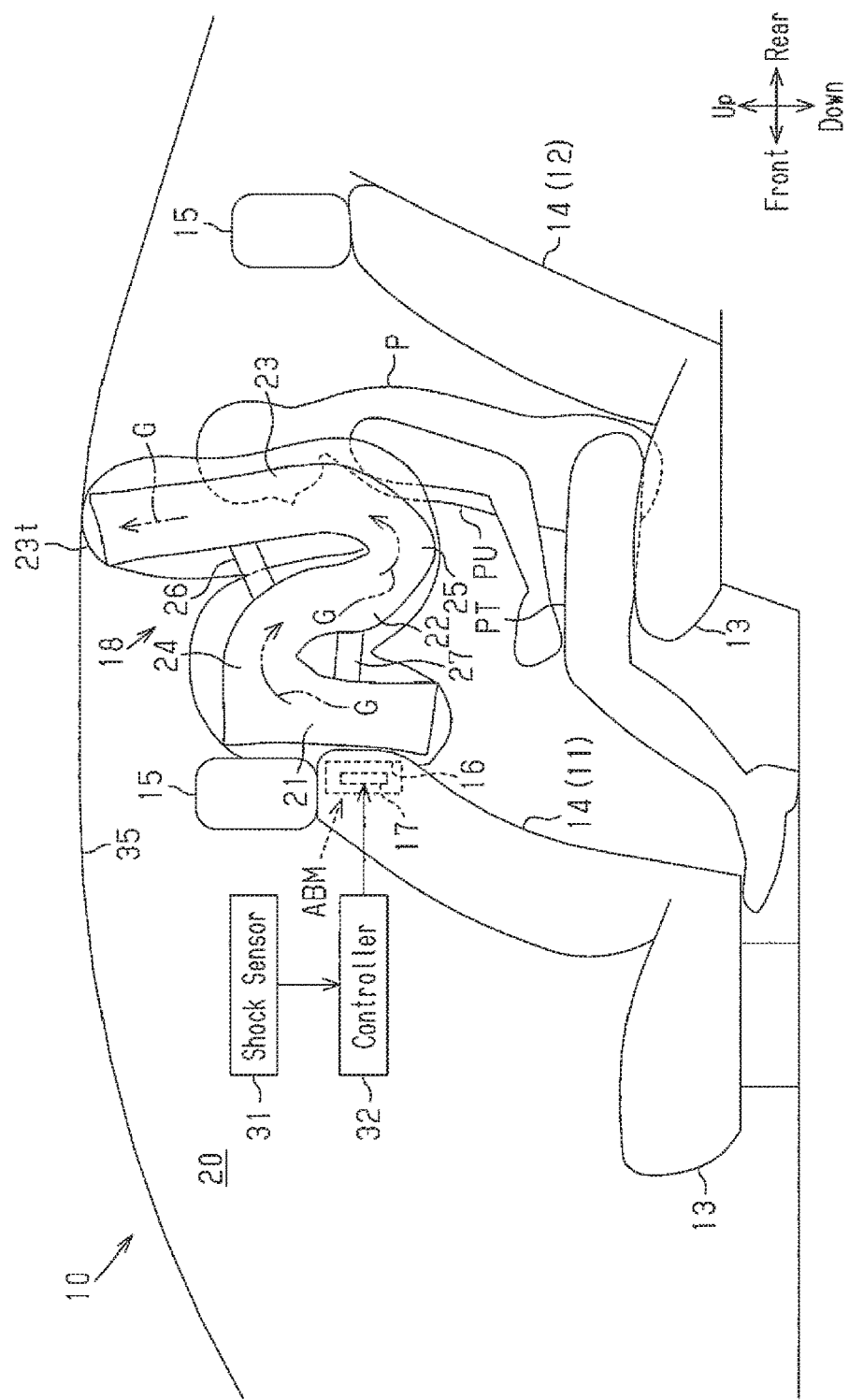

AIRBAG APPARATUS

BACKGROUND OF THE INVENTION

The present invention relates to an airbag apparatus that deploys and inflates an airbag in front of an occupant seated on a seat of a vehicle to protect the occupant from an impact applied to the vehicle in front of the seat.

An airbag apparatus is effective for protecting an occupant from an impact applied to the automobile, for example, during a collision. For example, U.S. Pat. No. 9,308,883 and US Patent Application Publication No. 2016/0107598 each disclose one type of an airbag apparatus that protects an occupant seated in a rear seat from an impact. The airbag apparatus includes an airbag and an inflator, which are accommodated in a housing located in the seatback of a front seat. The airbag includes two regular inflation portions, which are arranged next to each other from the housing toward the rear seat, and a connecting inflation portion, which connects upper ends of the two regular inflation portions to each other.

With the above airbag apparatus, when an impact is applied to the automobile from the front, the inflator supplies inflating gas to the front regular inflation portion in response to the impact. After passing through the front regular inflation portion, the inflating gas flows to the connecting inflation portion and the rear regular inflation portion. The inflating gas sequentially deploys and inflates the front regular inflation portion, the connecting inflation portion, and the rear regular inflation portion from the housing toward the rear seat.

When an impact is applied to the automobile from the front, the automobile stops. However, the upper body of the occupant, which is constrained by a seatbelt apparatus, will be forced diagonally forward by inertia. However, the airbag deploys and inflates in front of the occupant and receives the upper body of the occupant. This constrains the upper body of the occupant so that the upper body remains at the same position.

With the above prior art airbag apparatus, when the airbag deploys and inflates, the rear regular inflation portion, which directly receives the load of the upper body of the occupant that is forced diagonally forward, is separated toward the rear and distant from the front regular inflation portion, which is supported by the housing. This forms a large gap in the front-rear direction between the two regular inflation portions. When the rear regular inflation portion receives the load of the upper body of the occupant, which is forced diagonally forward, the rear regular inflation portion is deformed toward the front. There is no restriction that limits the forward deformation of the rear regular inflation portion. In this manner, the airbag constrains the occupant as the rear regular inflation portion greatly deforms forward when receiving the load of the upper body of the occupant. With the above prior art airbag apparatus, the occupant is practically constrained by only the rear regular inflation portion. Therefore, there is room for improvement for achieving appropriate constraint.

SUMMARY OF THE INVENTION

It is an object of the present invention to provide an airbag apparatus that constrains an occupant with an airbag in a more appropriate manner.

To achieve the above object, an airbag apparatus includes an inflator and an airbag accommodated in a housing that is located in front of a seat arranged in a passenger compartment of a vehicle. The airbag is configured to be deployed and inflated from the housing toward the seat by an inflating gas supplied from the inflator when an impact is applied to the vehicle from the front of the seat. The airbag includes at least three regular inflation portions arranged next to one another from the housing toward the seat, an upper connecting inflation portion that connects upper ends of adjacent ones of the regular inflation portions to each other, and a lower connecting inflation portion that connects lower ends of adjacent ones of the regular inflation portions to each other. The upper connecting inflation portion and the lower connecting inflation portion are alternately arranged from the housing toward the seat.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which:

FIG. 6 is a schematic side view corresponding to FIG. 3 showing that a second embodiment of an airbag of an airbag apparatus deploys and inflates to constrain the upper body of the occupant;

DETAILED DESCRIPTION OF THE PREFERRED EMBODIMENTS

First Embodiment

A first embodiment of an automobile airbag apparatus will now be described with reference to FIGS. 1 to 5B.

In the description hereafter, the direction in which the automobile moves forward is referred to as the forward direction, the direction in which the automobile moves backward is referred to as the rearward direction, and the automobile height-wise direction is referred to as the vertical direction. The frame of reference for the automobile lateral direction (sideward direction) is the automobile viewed from the rear.

Additionally, it is assumed that an occupant seated in a rear seat has the same body size as a dummy for collision tests.

Figure 3:
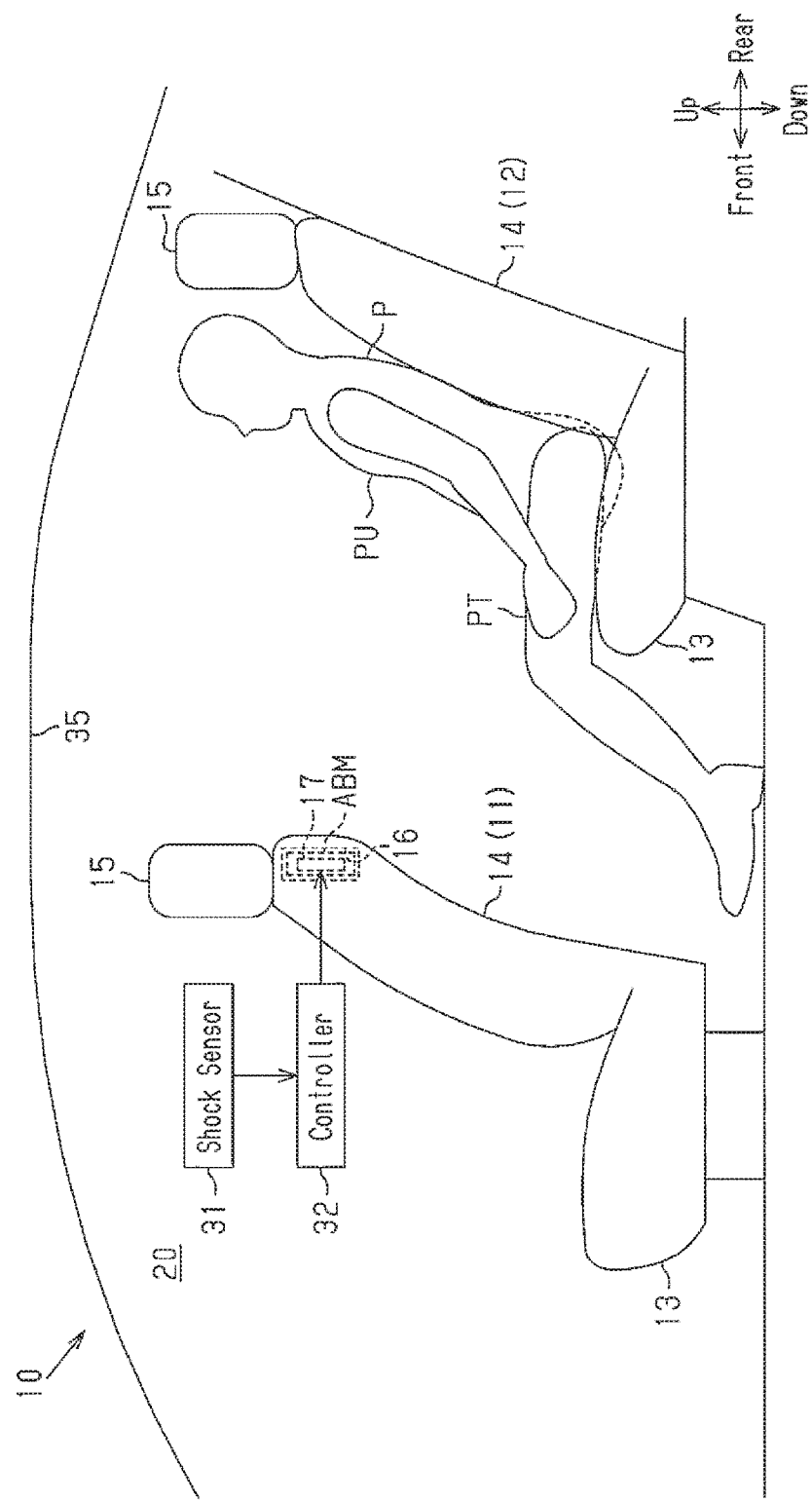
FIG. 3 is a schematic side view showing the structure of a passenger compartment to which the first embodiment of an airbag apparatus is applied.

As shown in FIG. 3, an automobile 10 has a passenger compartment 20 in which a front seat 11 and a rear seat 12 are arranged as automobile seats. The rear seat 12 is located at the rear of the front seat 11. The front seat 11 and the rear seat 12 each include a seat cushion 13, a seatback 14 upwardly extending from a rear portion of the seat cushion 13, and a headrest 15 located on the seatback 14. The front seat 11 and the rear seat 12 are arranged in the passenger compartment 20 so that the seatbacks 14 are oriented toward the front. When the front seat 11 and the rear seat 12 are arranged in this manner, the lateral direction of each of the front seat 11 and the rear seat 12 conforms to the automobile lateral direction.

Figure 1:
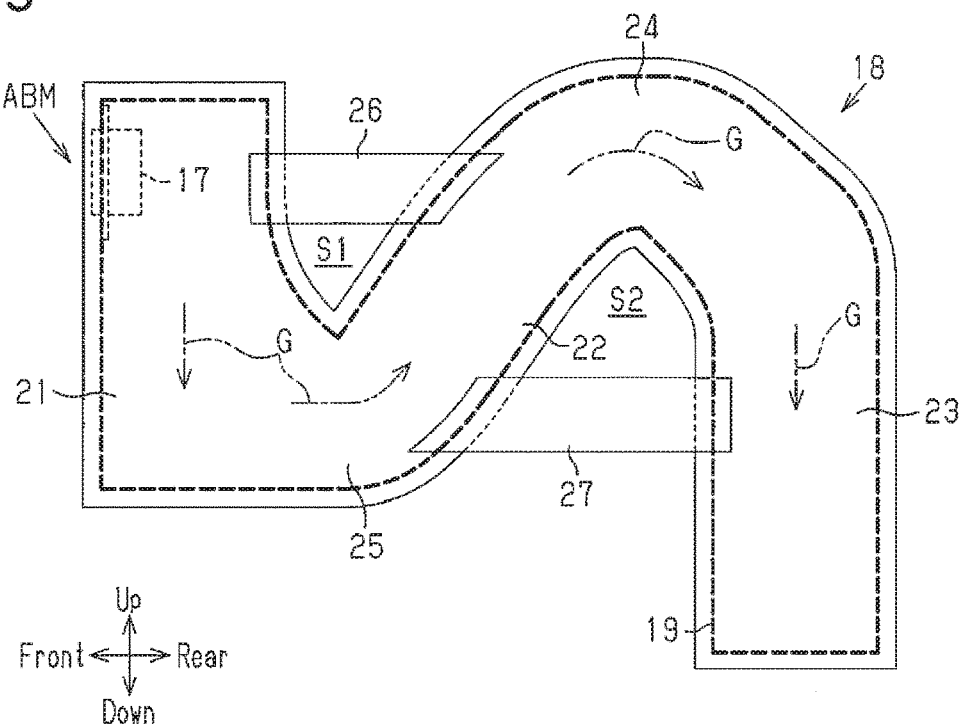
FIG. 1 is a side view showing a first embodiment of an airbag module.
Figure 2:
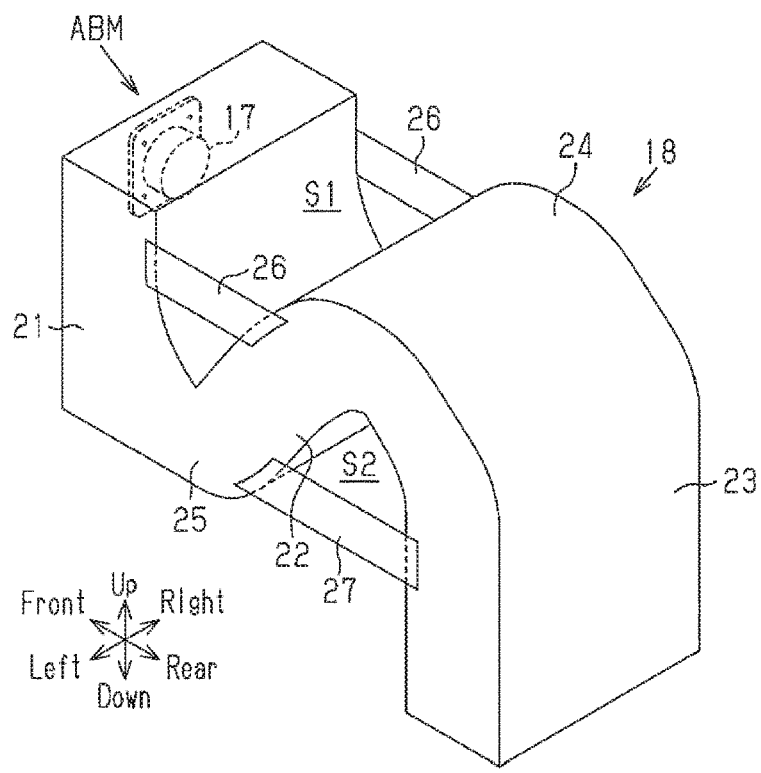
FIG. 2 is a perspective view showing the schematic structure of the airbag module of the first embodiment.

As shown in FIGS. 1 to 3, a housing 16 is located in an upper rear portion of the seatback 14 of the front seat 11. The housing 16 accommodates an airbag module ABM, which is a main portion of the airbag apparatus. The airbag module ABM includes an inflator 17 and an airbag 18 as main components.

The inflator 17 may be of a type accommodating a gas generating agent (not shown) that generates inflating gas. Alternatively, the inflator 17 may be of a type that includes a high-pressure gas cylinder filled with high-pressure gas. When a partition wall of the high-pressure gas cylinder is broken by gunpowder or the like, inflating gas is ejected.

The airbag 18 is formed using a plurality of cloth pieces. The cloth pieces may also be referred to as the base fabric or fabric panel. For example, woven clothes suitable for the cloth pieces are formed by a strong flexible material that is easy to fold such as a polyester yarn or a polyamide yarn. Rims of adjacent ones of the cloth pieces overlap with each other. The rims are sewed together by a sewing thread defining a rim joint portion 19. The rim joint portion 19 joins the adjacent cloth pieces. In FIG. 1, the rim joint portion 19 is indicated by the bold broken lines.

Alternatively, the rim joint portion 19 may be formed by a means that differs from the sewing with the sewing thread as described above. One example of such a means is the bonding with an adhesive agent.

The airbag 18 includes three regular inflation portions 21 to 23, one upper connecting inflation portion 24, and one lower connecting inflation portion 25. The three regular inflation portions 21 to 23 are arranged next to one another from the housing 16 toward the rear seat 12. To distinguish the regular inflation portions from one another, the regular inflation portions are referred to as a first regular inflation portion 21, a second regular inflation portion 22, and a third regular inflation portion 23 in the order from the front to the rear in the arrangement direction. The first regular inflation portion 21 and the third regular inflation portion 23 each extend in the vertical direction. The second regular inflation portion 22 is upwardly inclined toward the rear.

The inflator 17 is located at a front end of the first regular inflation portion 21 in the first regular inflation portion 21. The inflator 17 includes a plurality of bolts (not shown). The bolts are inserted through a front wall (not shown) of the first regular inflation portion 21.

The lower connecting inflation portion 25 connects a lower end of the first regular inflation portion 21 and a lower end of the second regular inflation portion 22. The lower connecting inflation portion 25 is not arranged between the lower end of the second regular inflation portion 22 and a lower end of the third regular inflation portion 23. The first regular inflation portion 21 and the second regular inflation portion 22 are in communication with each other through the lower connecting inflation portion 25.

The upper connecting inflation portion 24 connects an upper end of the second regular inflation portion 22 and an upper end of the third regular inflation portion 23. The upper connecting inflation portion 24 is not arranged between an upper end of the first regular inflation portion 21 and the upper end of the second regular inflation portion 22. The second regular inflation portion 22 and the third regular inflation portion 23 are in communication with each other through the upper connecting inflation portion 24.

As described above, the upper connecting inflation portion 24 and the lower connecting inflation portion 25 are alternately arranged from the housing 16 toward the rear seat 12. Thus, the airbag 18 includes a gas passage defined by inner empty spaces of the first regular inflation portion 21, the lower connecting inflation portion 25, the second regular inflation portion 22, the upper connecting inflation portion 24, and the third regular inflation portion 23, through which inflating gas G sequentially flows toward the rear zigzagging in the vertical direction.

In the direction in which the inflating gas G flows, the side close to the inflator 17 is referred to as, for example, "upstream" or "the upstream side," and the side distant from the inflator 17 is referred to as, for example, "downstream" or "the downstream side."

The second regular inflation portion 22 is attached to the first regular inflation portion 21 by two upper straps 26, which are located above the lower connecting inflation portion 25. The two upper straps 26, each of which includes a cloth piece extending in the front-rear direction, are located on the regular inflation portions 21, 22 at opposite sides in the automobile lateral direction. In the first embodiment, the rim joint portion 19 is used to couple each of the upper straps 26 to the first regular inflation portion 21 and the second regular inflation portion 22.

The third regular inflation portion 23 is attached to the second regular inflation portion 22 by two lower straps 27, which are located below the upper connecting inflation portion 24. The two lower straps 27, each of which includes a cloth piece extending in the front-rear direction, are located on the regular inflation portions 22, 23 at opposite sides in the automobile lateral direction. In the first embodiment, the rim joint portion 19 is used to couple each of the lower straps 27 to the second regular inflation portion 22 and the third regular inflation portion 23.

Figure 5A:
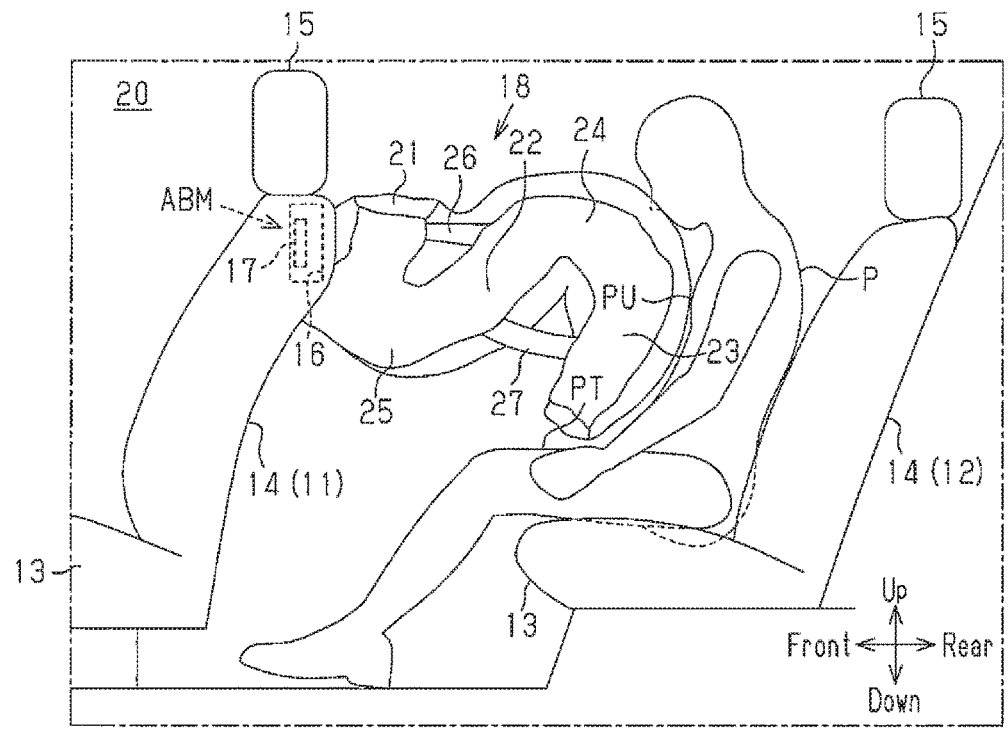
FIGS. 5A and 5B are schematic side views showing that the airbag of the first embodiment deploys and inflates to constrain the upper body of an occupant.
Figure 5B:
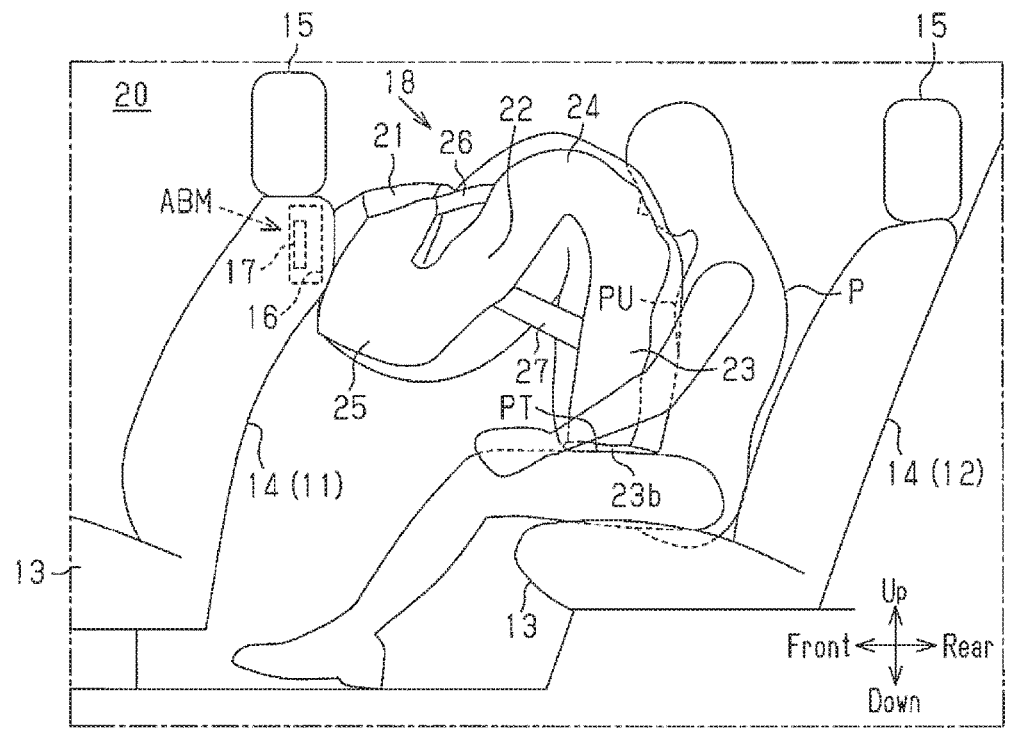

Further, as shown in FIG. 5B, in the first embodiment, the third regular inflation portion 23 includes a lower end surface 23b, the height of which is set so that the lower end surface 23b is located at a lower position than lower end surfaces of the first and second regular inflation portions 21, 22 and so that when the third regular inflation portion 23 deploys and inflates, the lower end surface 23b contacts both thighs PT of an occupant P who is seated in the rear seat 12 from above.

The airbag module ABM, which includes the inflator 17 and the airbag 18 as main components, is in a compact accommodation state when the airbag 18 is folded. This is suitable for accommodating the airbag module ABM in the housing 16, which is limited in size in the seatback 14. The airbag module ABM is held in the accommodation state by a binding tape (not show) or the like.

As shown in FIG. 3, the housing 16 accommodates the airbag module ABM that is held in the accommodation state. The bolts, which are extended from the inflator 17 and inserted through the front wall of the first regular inflation portion 21, are inserted through a seat frame (not shown)

located in the seatback 14 of the front seat 11. The bolts are coupled to nuts to fasten the inflator 17 to the seat frame together with the airbag 18.

Alternatively, the inflator 17 may be fixed to a high-strength member, which may be the seat frame, by a member that differs from bolts and nuts.

The airbag apparatus includes a shock sensor 31 and a controller 32 in addition to the airbag module ABM. The shock sensor 31, which is formed by an acceleration sensor or the like, detects an impact applied to the automobile 10 from the front. The controller 32 controls actuation of the inflator 17 based on a detection signal from the shock sensor 31.

The automobile 10 further includes seatbelt apparatuses that constrain occupants P who are seated in the front seat 11 and the rear seat 12 to the respective seats 11, 12. The drawings such as FIG. 3 do not show the seatbelt apparatuses.

The operation and advantages of the first embodiment will now be described.

When the shock sensor 31 does not detect that an impact is applied to the automobile 10 from the front, the controller 32 does not transmit an actuation signal for actuating the inflator 17 to the inflator 17. Thus, the inflating gas G will not be ejected. As shown in FIG. 3, the airbag 18 in the accommodation state continues to be accommodated in the housing 16.

For example, when the automobile 10 is traveling, if an impact is applied to the automobile 10 from the front, for example, by a front collision, the automobile 10 is stopped. However, an upper body PU of the occupant P seated in the rear seat 12 is diagonally forced forward by inertia.

When an impact having a predetermined value or greater is applied to the automobile 10 from the front and the shock sensor 31 detects the impact, the controller 32 transmits an actuation signal for actuating the inflator 17 based on the detection signal. In correspondence with the actuation signal, the inflator 17 ejects the inflating gas G. The ejected inflating gas G is first supplied to the first regular inflation portion 21, which is shown in FIGS. 1 and 2. The inflating gas G flows through the first regular inflation portion 21 and inflates the first regular inflation portion 21.

The inflating gas G, which downwardly flows from the inflator 17, changes the flow direction to upward when passing through the lower connecting inflation portion 25. The inflating gas G flows through the second regular inflation portion 22. The inflating gas G inflates the second regular inflation portion 22 obliquely upward from the lower end of the first regular inflation portion 21.

After flowing through the second regular inflation portion 22, the inflating gas G changes the flow direction to downward when passing through the upper connecting inflation portion 24. When the inflating gas G flows through the third regular inflation portion 23, the third regular inflation portion 23 downwardly inflates from the upper end of the second regular inflation portion 22.

Each of the three regular inflation portions 21 to 23, the lower connecting inflation portion 25, and the upper connecting inflation portion 24 unfolds, that is, deploys when inflated.

Figure 4A:
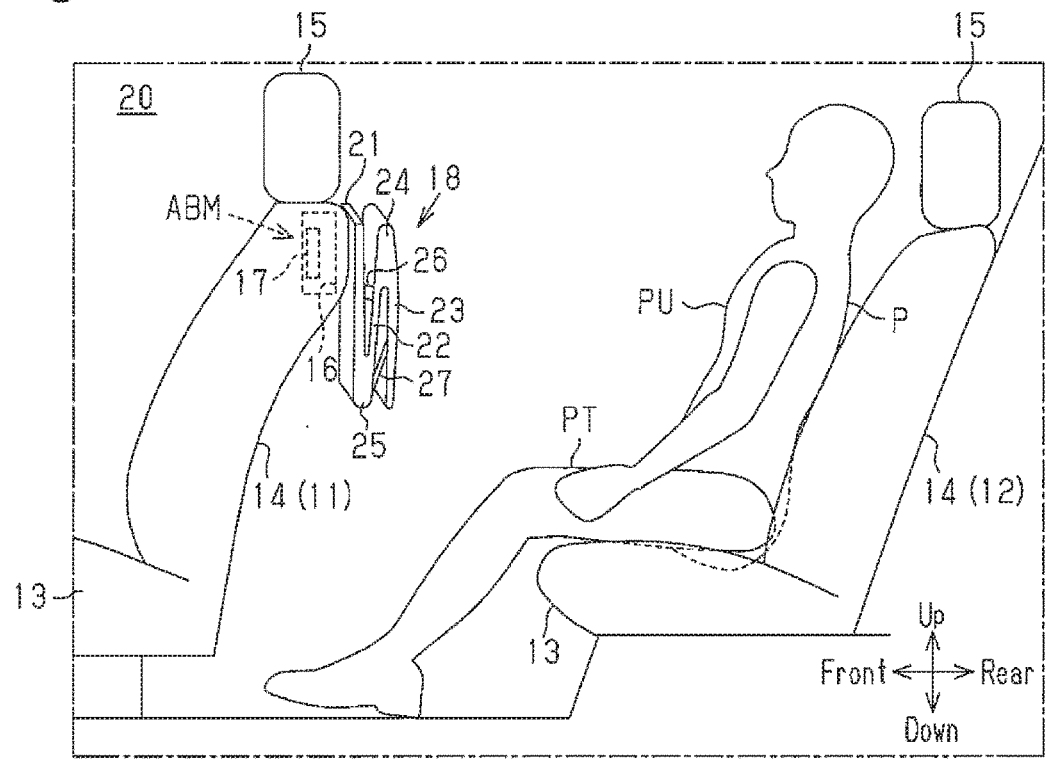
FIGS. 4A and 4B are schematic side views showing deployment and inflation of the first embodiment of an airbag.

When the airbag 18 deploys and inflates in the above manner, the airbag 18 pushes and breaks a portion of the seatback 14 located at the rear of the housing 16. As shown in FIG. 4A, the airbag 18 is ejected rearward from the seatback 14 through the broken portion while a portion of the airbag 18 remains in the housing 16.

Figure 4B:
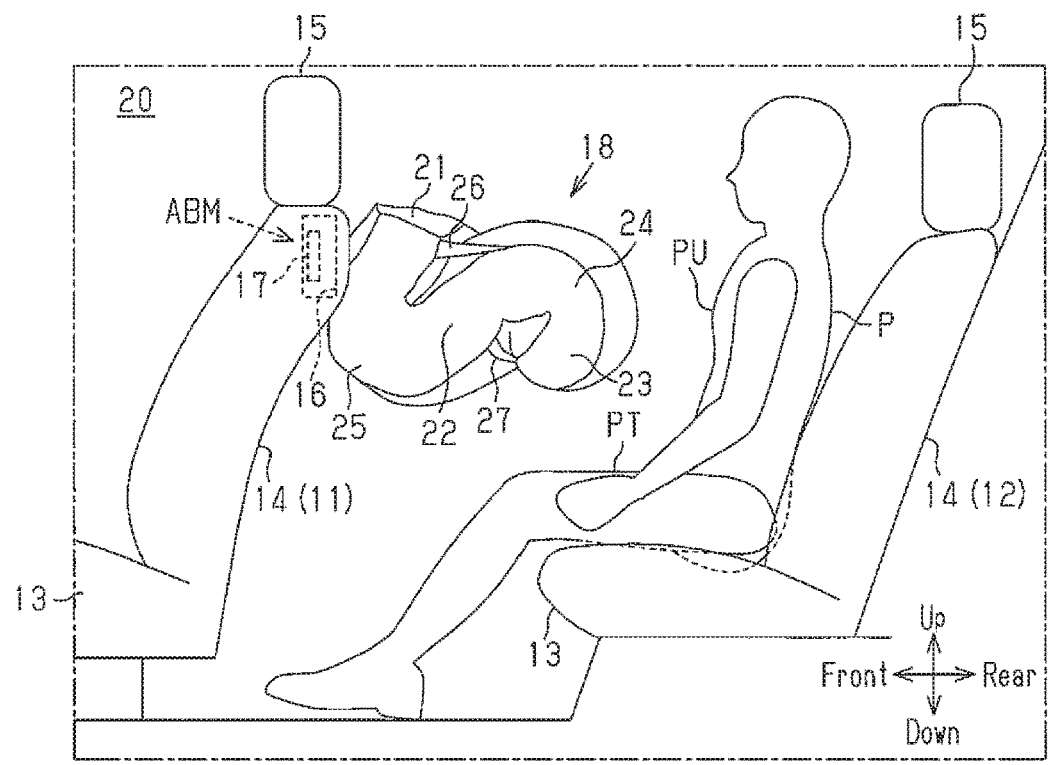

As shown in FIG. 4B, the airbag 18, which is continuously supplied with the inflating gas G, deploys and inflates rearward between the housing 16 and the rear seat 12.

When the second regular inflation portion 22 deploys and inflates, the second regular inflation portion 22 is pivoted about the lower connecting inflation portion 25 away from the first regular inflation portion 21 in, for example, the clockwise direction as viewed in FIG. 1. However, such rotation is restricted by the upper straps 26, which are attached to the two regular inflation portions 21, 22 above the lower connecting inflation portion 25. Because of the restriction, the second regular inflation portion 22 deploys and inflates in a state close to the first regular inflation portion 21.

When the third regular inflation portion 23 deploys and inflates, the third regular inflation portion 23 is pivoted about the upper connecting inflation portion 24 away from the second regular inflation portion 22 in, for example, the counterclockwise direction as viewed in FIG. 1. However, such rotation is restricted by the lower straps 27, which are attached to the two regular inflation portions 22, 23 below the upper connecting inflation portion 24. Because of the restriction, the third regular inflation portion 23 deploys and inflates in a state close to the second regular inflation portion 22.

This allows the airbag 18 to deploy and inflate between the housing 16 and the occupant P so that the first regular inflation portion 21 and the third regular inflation portion 23 extend in the vertical direction and so that the second regular inflation portion 22 is upwardly inclined toward the rear.

As shown in FIG. 5A, the third regular inflation portion 23, which directly receives the load of the upper body PU of the occupant P that is forced diagonally forward, is deformed toward the front.

As shown in FIGS. 1 and 2, the airbag 18 includes the three regular inflation portions 21 to 23. Thus, the adjacent regular inflation portions 21, 22 are located proximate to each other to decrease a gap S1 defined between the two regular inflation portions 21, 22 as compared to the airbag apparatuses disclosed in U.S. Pat. No. 9,308,883 and US Patent Application Publication No. 2016/0107598 and including two regular inflation portions. Also, the adjacent regular inflation portions 22, 23 are located proximate to each other to decrease a gap S2 defined by the two regular inflation portions 22, 23. Thus, when the third regular inflation portion 23 receives the load of the upper body PU of the occupant P, which is forced diagonally forward, and acts to deform forward, the deformation is restricted by the second regular inflation portion 22, which is closely located in front of the third regular inflation portion 23. Additionally, when the third regular inflation portion 23 pushes the second regular inflation portion 22, the second regular inflation portion 22 deforms forward. However, the deformation is restricted by the first regular inflation portion 21, which is closely located in front of the second regular inflation portion 22. The first regular inflation portion 21 is fastened to the seat frame. Thus, even when the second regular inflation portion 22 pushes the first regular inflation portion 21 and the first regular inflation portion 21 acts to greatly deform forward, the deformation is restricted by the seat frame. The load of the occupant P is received by the three first to third regular inflation portions 21 to 23, each of which is hindered from great forward deformation. This allows for appropriate constraint of the upper body PU of the occupant P so that the upper body PU remains at the same position as compared to the airbag apparatuses disclosed in U.S. Pat. No. 9,308,883 and US Patent Application Publication No.

2016/0107598, which practically receive the load with only one of the regular inflation portions.

Additionally, as shown in FIG. 5B, when the inflating gas G deploys and inflates the third regular inflation portion 23 downwardly from the upper end of the second regular inflation portion 22, the lower end surface 23b of the third regular inflation portion 23 contacts the thighs PT of the occupant P seated in the rear seat 12 from above. The airbag 18 is supported by the housing 16 at the first regular inflation portion 21 and supported by the thighs PT at the third regular inflation portion 23. Thus, the airbag 18 is supported by the two points. Moreover, the supporting is performed by the first regular inflation portion 21, which is the upstream-most one of the three regular inflation portions 21 to 23, and the third regular inflation portion 23, which is the downstream-most one of the three regular inflation portions 21 to 23. This further limits forward deformation of the third regular inflation portion 23 when receiving the load of the upper body PU of the occupant P, which is forced diagonally forward. Thus, the property of the airbag 18 for constraining the occupant P is further improved.

Second Embodiment

A second embodiment of an automobile airbag apparatus will now be described with reference to FIG. 6.

The second embodiment is the same as the first embodiment in that the airbag 18 includes three regular inflation portions 21 to 23, one upper connecting inflation portion 24, and one lower connecting inflation portion 25, and that the upper connecting inflation portion 24 and the lower connecting inflation portion 25 are alternately arranged from the housing 16 toward the rear seat 12. The second embodiment differs from the first embodiment in two regular inflation portions that are connected by the upper connecting inflation portion 24 and two regular inflation portions that are connected by the lower connecting inflation portion 25. Additionally, the second embodiment differs from the first embodiment in two regular inflation portions that are attached together by the upper straps 26 and two regular inflation portions that are attached together by the lower straps 27.

More specifically, in the second embodiment, the upper connecting inflation portion 24 connects the upper end of the first regular inflation portion 21 and the upper end of the second regular inflation portion 22. The upper connecting inflation portion 24 is not arranged between the upper end of the second regular inflation portion 22 and the upper end of the third regular inflation portion 23. The first regular inflation portion 21 and the second regular inflation portion 22 are in communication with each other through the upper connecting inflation portion 24.

The lower connecting inflation portion 25 connects the lower end of the second regular inflation portion 22 and the lower end of the third regular inflation portion 23. The lower connecting inflation portion 25 is not arranged between the lower end of the first regular inflation portion 21 and the lower end of the second regular inflation portion 22. The second regular inflation portion 22 and the third regular inflation portion 23 are in communication with each other through the lower connecting inflation portion 25.

The first regular inflation portion 21 and the second regular inflation portion 22 are attached together by the two lower straps 27, which are located below the upper connecting inflation portion 24. The second regular inflation portion 22 and the third regular inflation portion 23 are attached together by the two upper straps 26, which are located above the lower connecting inflation portion 25.

Additionally, the third regular inflation portion 23 includes an upper end surface 23t, the height of which is set so that the upper end surface 23t is located at a higher position than upper end surfaces of the first and second regular inflation portions 21, 22 and so that when the third regular inflation portion 23 deploys and inflates, the upper end surface 23t contacts a ceiling 35 of the passenger compartment 20.

The remaining structure of the second embodiment is the same as that of the first embodiment. Thus, the same reference characters are given to elements that are the same as the corresponding elements of the first embodiment. Such elements will not be described in detail.

In the second embodiment, for example, when the automobile 10 is traveling, if an impact is applied to the automobile 10 from the front, for example, by a front collision, the inflator 17 ejects the inflating gas G. The inflating gas G first inflates the first regular inflation portion 21.

The inflating gas G, which upwardly flows through the first regular inflation portion 21, changes the flow direction to obliquely downward when passing through the upper connecting inflation portion 24. The inflating gas G, which flows through the second regular inflation portion 22, inflates the second regular inflation portion 22 obliquely downward from the upper end of the first regular inflation portion 21.

After flowing through the second regular inflation portion 22, the inflating gas G changes the flow direction to upward when passing through the lower connecting inflation portion 25. The inflating gas G, which flows through the third regular inflation portion 23, inflates the third regular inflation portion 23 upward from the lower end of the second regular inflation portion 22.

Each of the three regular inflation portions 21 to 23, the upper connecting inflation portion 24, and the lower connecting inflation portion 25 unfolds, that is, deploys when inflated.

The airbag 18 deploys and inflates between the housing 16 and the rear seat 12. Accordingly, the second embodiment has the same operation and advantages as the first embodiment.

Additionally, in the second embodiment, when the inflating gas G deploys and inflates the third regular inflation portion 23 upward from the lower end of the second regular inflation portion 22, the upper end surface 23t of the third regular inflation portion 23 contacts the ceiling 35. The airbag 18 is supported by the housing 16 at the first regular inflation portion 21 and supported by the ceiling 35 at the third regular inflation portion 23. Thus, the airbag 18 is supported by the two points. Moreover, the supporting is performed by the first regular inflation portion 21, which is the upstream-most one of the three regular inflation portions 21 to 23, and the third regular inflation portion 23, which is the downstream-most one of the three regular inflation portions 21 to 23. Thus, when the third regular inflation portion 23 receives the load of the upper body PU of the occupant P that is forced diagonally forward, forward deformation is limited in the same manner as the first embodiment. Thus, the property of the airbag 18 for constraining the occupant P is improved in the same manner as the first embodiment.

Third Embodiment

A third embodiment of an automobile airbag apparatus will now be described with reference to FIG. 7.

The rear surface of the seatback 14 of the front seat 11 has a portion downwardly adjacent to the housing 16 and sunken forward defining a recessed engaged portion 36. The engaged portion 36 includes an inclined surface 36a, which is upwardly inclined toward the rear.

The airbag 18 includes a support inflation portion 37, which is in communication with the first regular inflation portion 21. The support inflation portion 37 projects forward from a front wall of the first regular inflation portion 21 at a lower position than the inflator 17. The support inflation portion 37 is shaped so that the dimension in the vertical direction is decreased toward the front. The support inflation portion 37 includes an upper surface defined by an inclined surface 37a, which is upwardly inclined toward the rear in conformance with the inclined surface 36a of the engaged portion 36.

The remaining structure of the third embodiment is the same as that of the first embodiment. Thus, the same reference characters are given to elements that are the same as the corresponding elements of the first embodiment. Such elements will not be described in detail.

Accordingly, the third embodiment has the same operation and advantages as the first embodiment.

Additionally, the inflating gas G, which is supplied to the first regular inflation portion 21 from the inflator 17, partially flows to the support inflation portion 37. When the inflating gas G inflates the support inflation portion 37, the support inflation portion 37 projects forward from the first regular inflation portion 21. The inclined surface 37a of the support inflation portion 37 contacts the inclined surface 36a of the engaged portion 36. This engages the support inflation portion 37 with the engaged portion 36.

In the flow direction of the inflating gas G, the upstream portion of the airbag 18 is supported by the housing 16 at the first regular inflation portion 21 and supported by the engaged portion 36 at the support inflation portion 37. Thus, the upstream portion of the airbag 18 is supported by the two points arranged in the vertical direction. This stabilizes the position in the vertical direction when the first regular inflation portion 21 deploys and inflates as compared to a structure that does not include the support inflation portion 37.

It should be apparent to those skilled in the art that the present invention may be embodied in many other specific forms without departing from the scope of the invention. Particularly, it should be understood that the present invention may be embodied in the following forms.

In each of the above embodiments, the number of regular inflation portions may be changed to four or more. In this case, the upper connecting inflation portions 24 and the lower connecting inflation portions 25 are alternately arranged from the housing 16 toward the rear seat 12. When the number of regular inflation portions is changed, the sum of the number of sideward pairs of the upper straps 26 and the number of sideward pairs of the lower straps 27 is changed to a number that is less than the number of regular inflation portions by one. Even when such a change is made, the same advantages as the above embodiments may be obtained.

The shape of the support inflation portion may be changed to that satisfying the following conditions.

Figure 8A:
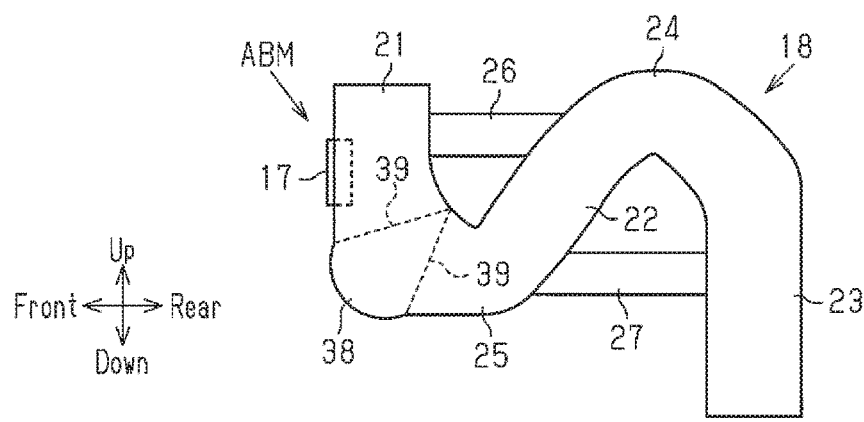
FIG. 8A is a side view showing a modified example of an airbag module including a support inflation portion.

Condition 1: support inflation portion is in communication with the upstream-most one of the regular inflation portions in the flow direction of the inflating gas Condition 2: support inflation portion projects forward from the upstream-most one of the regular inflation portions and engages the engaged portion 36 thereby supporting the regular inflation portion FIG. 8A shows a modified example including a support inflation portion 38 that projects forward from the front wall of the first regular inflation portion 21 in a moderately curved state. The support inflation portion 38 differs from the support inflation portion 37 of the third embodiment in that the outer surface is mostly curved.

To inflate the support inflation portion 38 in a curved state as described above, two tethers 39 formed by cloth pieces are located in the first regular inflation portion 21. The tethers 39 each have a rear end portion that is joined to a rear wall of the first regular inflation portion 21, for example, by sewing. The tethers 39 each have a front end portion that is joined to a front wall of the first regular inflation portion 21 at boundary portions of the support inflation portion 38 and the first regular inflation portion 21, for example, by sewing. The tethers 39 each have a hole that allows the inflating gas to pass through.

In this modified example, when the inflating gas inflates the first regular inflation portion 21, the inflation tensions the tethers 39. The tense state of the tethers 39 limits excessive inflation of the first regular inflation portion 21 in the front-rear direction. The inflating gas, which is supplied to the first regular inflation portion 21, partially flows into the support inflation portion 38. When the inflating gas is supplied, the support inflation portion 38 inflates in a curved state so that the dimension in the vertical direction is maximal at the boundary portion with the front wall of the first regular inflation portion 21 and becomes smaller at positions separated away from the front wall toward the front. The support inflation portion 38, which inflates as described above, contacts the inclined surface 36a of the engaged portion 36. This engages the support inflation portion 38 with the engaged portion 36. In this modified example, the same operation and advantages as the third embodiment may be obtained.

Figure 8B:
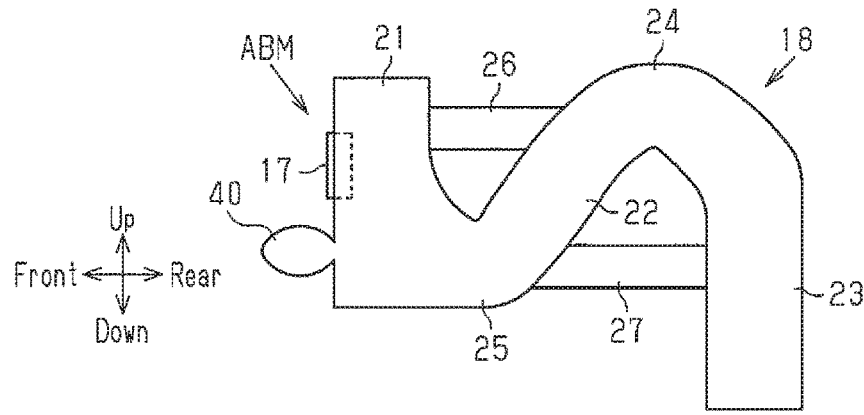
FIG. 8B is a side view showing another modified example of an airbag module having a support inflation portion.

FIG. 8B shows a modified example including a support inflation portion 40, the outer surface of which is mostly curved in the same manner as the support inflation portion 38. However, when the inflating gas is supplied, the support inflation portion 40 inflates in a curved state so that the dimension in the vertical direction is maximal at a middle portion in the front-rear direction. When the inflated support inflation portion 40 contacts the inclined surface 36a of the engaged portion 36, the support inflation portion 40 engages the engaged portion 36. Thus, the same operation and advantages as the third embodiment may be obtained.

Figure 7:
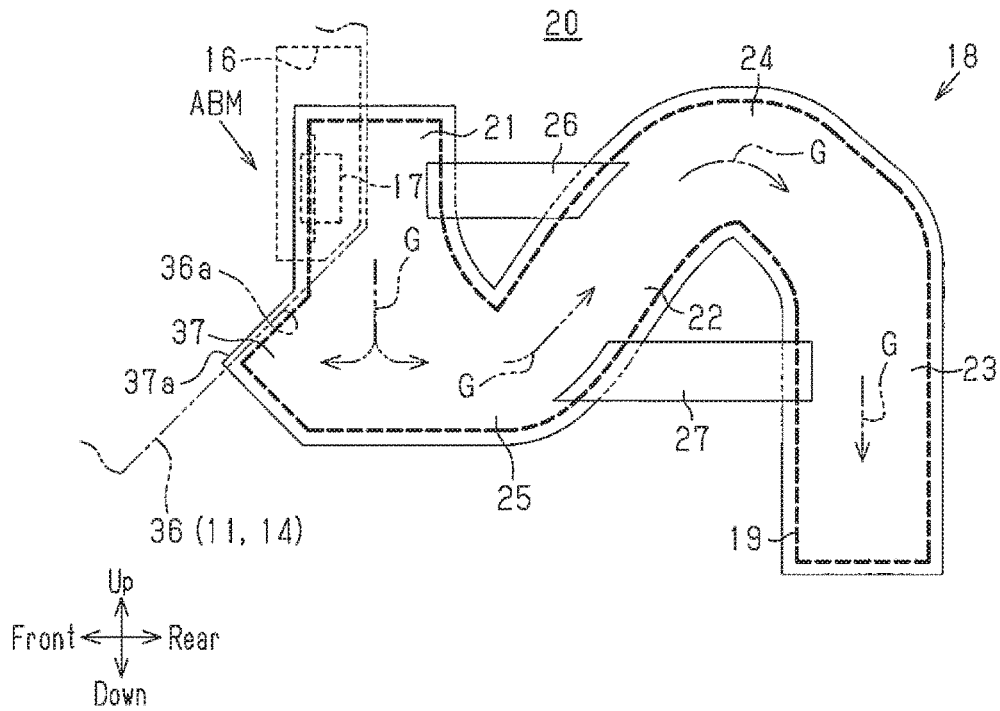
FIG. 7 is a side view showing a third embodiment of an airbag module.

The airbag apparatuses shown in FIGS. 7, 8A, and 8B are applicable to a case in which the recessed engaged portion 36 is defined by a portion of the rear surface of the seatback 14 of the front seat 11 that is upwardly adjacent to the housing 16 and sunken forward. In this case, the position of each of the support inflation portions 37, 38, 40 in the first regular inflation portion 21 is changed to a location where the support inflation portions 37, 38, 40 engage the engaged portion 36 when projecting forward, for example, a location above the inflator 17. Even when such a change is made, the same advantages as the third embodiment may be obtained.

The support inflation portions 37, 38, 40 are also applicable to the first regular inflation portion 21 of the airbag 18 of the second embodiment.

Housing 16 of Airbag Module ABM

The housing 16 may be arranged at a location of the front seat 11 that differs from the seatback 14. For example, the housing 16 may be arranged in the headrest 15, which is located above the seatback 14.

The housing 16 may be arranged at a location other than the front seat 11 as long as the location is the front of the rear seat 12.

Structure of Airbag 18

As described in each of the above embodiments, the substantially entire portion of the airbag 18 may be inflated by the inflating gas G. Alternatively, the airbag 18 may include a non-inflation portion that is not supplied with the inflating gas G and will not inflate.

Others

The above airbag apparatuses may protect an occupant seated in the front seat 11 from an impact. In this case, the housing 16 is arranged at the front of the front seat 11.

When the automobile 10 includes an automobile seat arranged so that the seatback 14 is oriented in a direction (e.g., sideward) that differs from the front of the automobile 10, the airbag apparatus is applicable to an airbag apparatus of a type that protects the occupant P of the automobile 10 from an impact applied to the automobile 10 in front of the seat (sideward of automobile 10).

The automobile 10 to which the airbag apparatuses are applied is not limited to a private car and includes various kinds of industrial vehicles.

The above airbag apparatuses may be installed to a vehicle other than an automobile such as an aircraft or a vessel and used as airbag apparatuses that protect occupants seated in vehicle seats.

The present examples and embodiments are to be considered as illustrative and not restrictive, and the invention is not to be limited to the details given herein, but may be modified within the scope and equivalence of the appended claims.

The invention claimed is:

1. An airbag apparatus comprising:
   an inflator; and
   an airbag accommodated in a housing that is located in front of a seat arranged in a passenger compartment of a vehicle, wherein the airbag is configured to be deployed and inflated from the housing toward the seat by an inflating gas supplied from the inflator when an impact is applied to the vehicle from the front of the seat, wherein
   the airbag includes at least three regular inflation portions arranged next to one another from the housing toward the seat, an upper connecting inflation portion that connects upper ends of adjacent ones of the regular inflation portions to each other, and a lower connecting inflation portion that connects lower ends of adjacent ones of the regular inflation portions to each other, and
   the upper connecting inflation portion and the lower connecting inflation portion are alternately arranged from the housing toward the seat.

2. The airbag apparatus according to claim 1, wherein
   two of the regular inflation portions, which are connected by the lower connecting inflation portion, are attached together by an upper strap located above the lower connecting inflation portion.

3. The airbag apparatus according to claim 1, wherein
   two of the regular inflation portions, which are connected by the upper connecting inflation portion, are attached together by a lower strap located below the upper connecting inflation portion.

4. The airbag apparatus according to claim 1, wherein the upper connecting inflation portion connects a downstream-most one of the regular inflation portions to an adjacent one of the regular inflation portions that is located at an upstream side in a flow direction of the inflating gas.

5. The airbag apparatus according to claim 4, wherein the downstream-most one of the regular inflation portions includes a lower end surface that is set at a height at which the lower end surface contacts both thighs of an occupant seated in the seat when the downstream-most one of the regular inflation portions is deployed and inflated.

6. The airbag apparatus according to claim 1, wherein the lower connecting inflation portion connects a downstream-most one of the regular inflation portions to an adjacent one of the regular inflation portions located at an upstream side in a flow direction of the inflating gas.

7. The airbag apparatus according to claim 6, wherein the downstream-most one of the regular inflation portions includes an upper end surface that is set at a height at which the upper end surface contacts a ceiling of the passenger compartment when the downstream-most one of the regular inflation portions is deployed and inflated.

8. The airbag apparatus according to claim 1, wherein
   the passenger compartment includes a recessed engaged portion at a location adjacent to the housing in a vertical direction,
   the airbag includes a support inflation portion that is in communication with an upstream-most one of the regular inflation portions in a flow direction of the inflating gas, and
   the support inflation portion projects forward from the upstream-most one of the regular inflation portions and engages the engaged portion to support the regular inflation portion.

* * * * *